US012794313B2

(12) United States Patent
Hofer et al.

(10) Patent No.: US 12,794,313 B2
(45) Date of Patent: Nov. 10, 2026

(54) BUILT ROTOR SHAFT OF AN ELECTRIC MOTOR

(71) Applicant: MAHLE International GmbH, Stuttgart (DE)

(72) Inventors: Alexandra Hofer, Fellbach (DE); Christoph Steinmetz, Ludwigsburg (DE)

(73) Assignee: Mahle International GmbH (DE)

( * ) Notice: Subject to any disclaimer, the term of this patent is extended or adjusted under 35 U.S.C. 154(b) by 440 days.

(21) Appl. No.: 18/210,631

(22) Filed: Jun. 15, 2023

(65) Prior Publication Data

US 2024/0048022 A1 Feb. 8, 2024

(30) Foreign Application Priority Data

Jun. 15, 2022 (DE) ..................... 10 2022 206 040.7

(51) Int. Cl.
*H02K 7/00* (2006.01)
*H02K 1/32* (2006.01)

(52) U.S. Cl.
CPC ............... *H02K 7/003* (2013.01); *H02K 1/32* (2013.01)

(58) Field of Classification Search
CPC ................................. H02K 1/32; H02K 7/003
USPC ............................................................ 310/58
See application file for complete search history.

(56) References Cited

U.S. PATENT DOCUMENTS 10,630,147 B2 * 4/2020 Knoblauch ............ H02K 9/197
10,862,360 B2 * 12/2020 Paul ......................... H02K 9/12
11,152,827 B2 * 10/2021 Krais ..................... H02K 1/276
11,177,709 B2 * 11/2021 Krais ..................... H02K 1/276
11,303,174 B2 4/2022 Fröhlich
2016/0352186 A1 * 12/2016 Faistauer ............... H02K 7/003
2019/0199152 A1 * 6/2019 Weinmeister ............ H02K 1/28
2020/0373815 A1 * 11/2020 Lang ...................... H02K 7/083
2022/0131441 A1 * 4/2022 Loos ...................... H02K 7/003

FOREIGN PATENT DOCUMENTS

DE 102016216685 A1 3/2018
DE 102018220810 A1 6/2020
DE 102018222469 A1 6/2020
DE 102020200197 A1 * 7/2021 ............... H02K 1/32
DE 102020200197 B4 * 1/2022 ............... H02K 1/32
JP 2020028186 A 2/2020

OTHER PUBLICATIONS

Translation of foreign document JP 2020028186 A (Year: 2020).*
English abstract DE-102018220810A1.
English abstract for DE-102018222469.
German Search Report DE-102022206040.7, mailed Mar. 22, 2023.

* cited by examiner

*Primary Examiner* — Alex W Mok
(74) *Attorney, Agent, or Firm* — Fishman Stewart PLLC

(57) ABSTRACT

A built rotor shaft of an electric motor may include a hollow shaft, a shaft end piece, and a channel for cooling medium conduction. The shaft end piece may have a joining region. The shaft end piece may be arranged in a longitudinal end side of the hollow shaft. The channel may connect an interior of the hollow shaft with an environment. The channel may include an opening arranged in the hollow shaft. The channel may also include a channel section communicatingly connected with the opening in the joining region of the shaft end piece.

13 Claims, 3 Drawing Sheets

BUILT ROTOR SHAFT OF AN ELECTRIC MOTOR

CROSS-REFERENCE TO RELATED APPLICATIONS

This application claims priority to German Patent Application No. 10 2022 206 040.7, filed on Jun. 15, 2022, the contents of which is hereby incorporated by reference in its entirety.

TECHNICAL FIELD

The present invention relates to a built rotor shaft of an electric motor. In addition, the invention relates to an electric motor having such a built rotor shaft.

BACKGROUND

Rotor shafts, in particular hollow rotor shafts, offer the possibility with suitably embodied design of introducing a cooling medium via a shaft end piece, for example oil for cooling into a shaft of the rotor shaft. When doing so, the cooling medium is conducted in a shaft of the rotor shaft along a shaft wall and conducted out again at one or both shaft ends or shaft end pieces. In the case of rotor shafts of compact design, in which the geometry necessary for transmitting the torque extends for example in the form of a plug connection extends as far as to below the shaft body, complex processing is partly required for example in the form of angled holes for conducting the cooling medium round about the output geometry. Because of a technically necessary throttling effect of the bores, a small bore diameter and large bore lengths then coincide, which render the production correspondingly complex and cost-intensive, in particular also with respect to the deburring of the bore in the shaft interior.

SUMMARY

The present invention therefore deals with the problem of stating a built rotor shaft of an electric motor with which the disadvantages known from the prior art can be overcome.

According to the invention, this problem is solved through the subject matter of the independent claim(s). Advantageous embodiments are the subject matter of the dependent claim(s).

The present invention is based on the general idea of simplifying a production of a geometry required for conducting a cooling medium out of a shaft of a rotor shaft into the environment in that a splitting of the function "media outlet from the shaft" and "media conduction in the shaft in the region of a shaft end piece" is carried out. A split takes place in such a manner that a shaft of the built rotor shaft itself has at least one opening, in particular an outlet opening and a shaft end piece connected to the shaft makes available the geometry required for the cooling medium conduction. The built rotor shaft of an electric motor according to the invention has a hollow shaft into which on the longitudinal end side a joining region of a shaft end piece is introduced. Additionally provided is a channel for cooling medium conduction which connects an interior of the shaft with an environment. This channel comprises an opening arranged in the shaft for example the previously mentioned outlet bore and a channel section communicatingly connected therewith in the joining region of the shaft end piece, as a result of which the separation of the media conduction according to the invention takes place. In the rotor shaft built according to the invention, in particular a thin, inclined and thus complicated and expensive drilling of a channel conducting a cooling medium is dispensable, as a result of which the built rotor shaft can be produced on the one hand with a high quality and on the other hand cost-effectively.

In an advantageous further development of the rotor shaft according to the invention, the opening arranged in the shaft is formed as radial bore. Such a radial bore can be comparatively easily and cost-effectively introduced into the shaft since for this purpose neither a very deep nor a drilling of small bores with small diameters, i.e. the use of thin drills, is required.

In a further advantageous embodiment of the built rotor shaft, the channel section is formed as a longitudinal groove or as a circumferential flat. Such a longitudinal groove of the shaft end piece has to be oriented with respect to an angle of rotation position of the shaft end piece relative to the hollow shaft so that the same is aligned in the axial direction with the opening arranged in the shaft and because of this makes possible the desired cooling medium conduction. By way of a circumferential flat of the joining region of the shaft end piece a channel section can likewise be created, wherein this circumferential flat in the axial direction should likewise align with the opening arranged in the shaft in order to make possible the cooling medium conduction from an interior of the shaft to the outside. Because of the longitudinal groove or (circumferential) flat arranged close the wall, i.e. close an internal lateral surface of the shaft by way of their geometrical characteristic, the volume of the cooling medium can be adjusted in a comparatively simple manner since the same collects on the inner lateral surface of the shaft because of the centrifugal forces developing during the rotation of the shaft and can be discharged from there via the longitudinal groove or the circumferential flat and the opening in the shaft, i.e. either only little cooling medium is held within the shaft or a larger volume for regulating the heat transfer can be maintained. Together with the inner lateral surface of the shaft, the longitudinal groove or the circumferential flat forms the channel section.

In a particularly preferred embodiment of the built rotor shaft according to the invention, the joining region of the shaft end piece comprises a circumferential groove crossing the channel section. In this case, the joining region of the shaft end piece thus has a circumferential groove that is open towards the outside, into which on the one hand the channel section leads and which on the other hand, with the shaft end piece inserted into the shaft of the rotor shaft, is communicatingly aligned with the opening arranged in the shaft. Such a circumferential groove offers the great advantage that the shaft end piece can be inserted into the shaft regardless of the angle of rotation and always makes possible regardless of the angle of rotation position a communicating connection from an interior of the shaft via the channel section, the circumferential groove and the opening in the shaft to the outside. Such a circumferential groove can be comparatively easily produced, for example by milling or simultaneously with the production of the shaft end piece.

In an alternative embodiment of the built rotor shaft according to the invention, the joining region of the shaft end piece likewise comprises a circumferential groove which with finish-mounted rotor shaft is communicatingly connected with the opening in the shaft. However, the channel section for connecting the circumferential groove with the interior of the shaft in this case is not formed by a longitudinal groove or a circumferential flat but runs inclined relative to a shaft axis and because of this opens radially significantly further inside than for example the longitudinal groove or the circumferential flat arranged outside on a joining region. By way of the channel section extending inclined relative to the shaft axis, a cooling medium discharge out of the interior that is in particular distant from the wall can take place as a result of which an enlarged cooling medium volume can be held in the shaft of the rotor shaft.

In an advantageous further development of the built rotor shaft according to the invention, the circumferential groove is sealed via a first sealing collar and a second sealing collar relative to an internal lateral surface of the shaft. By way of this it can be ensured that a discharge of cooling medium from the interior of the shaft exclusively takes place via the channel section and not for example reaches the outside for example by way of leakages between shaft end piece and shaft.

Practically, the shaft end piece with its joining region is pressed, glued, soldered or welded in the shaft. Even this inconclusive enumeration gives an idea of the manifold possibilities of fixing the shaft end piece in the shaft that are available. In particular a pressing makes possible a quick and firm joining of the shaft end piece with the shaft at the same time. Alternatively, a thermal joining connection is obviously also conceivable with which the shaft prior to the joining is heated and/or the shaft end piece cooled at least in its joining region. Upon inserting the joining region into the shaft and a subsequent temperature equalization, the joining region of the shaft end piece expands or the shaft contracts, as a result of which a firm fixing of the shaft end piece in the shaft takes place.

In a further advantageous embodiment of the rotor shaft according to the invention, the shaft end piece comprises an output element. Such an output element is arranged axially adjacent the joining region of the shaft end piece that engages in the shaft and can for example carry an external toothing or be formed as such. By way of such an output element, a drive of downstream components can take place by means of the rotor shaft. Such an external toothing can obviously be utilized also for producing a plug connection.

Further, the present invention is based on the general idea of stating a liquid-cooled electric motor with a built rotor shaft according to the preceding paragraphs, as a result of which the advantages described regarding the rotor shaft can also be transferred to the electric motor. Concretely, the advantages lie in a cost-effective since in particular simpler production of the rotor shaft, since in particular a complicated, deep and thus sensitive drilling to be carried out with thin drills can be omitted. By omitting such bores, a deburring of the same is likewise not required, in particular at an opening into the interior, as a result of which the production is again simplified.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention. Parts of a higher unit, such as for example an installation, a device or an arrangement that are referred to separately mentioned above and still to be named in the following can form separate components of the said unit or be integral regions or sections of the said unit, even when this is shown differently in the drawings.

Preferred exemplary embodiments of the invention are shown in the drawings and are explained in more detail in the following description, wherein same reference numbers relate to same or similar or functionally same components.

BRIEF DESCRIPTION OF THE DRAWINGS

There it shows, in each case schematically.

DETAILED DESCRIPTION

Figure 1:
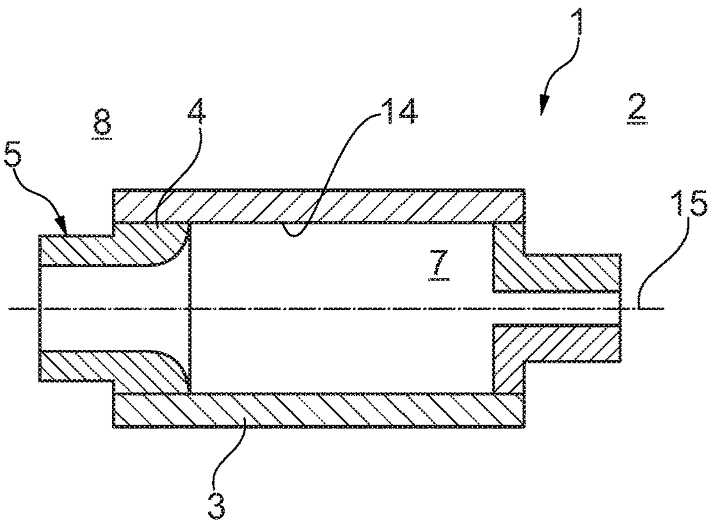
FIG. 1 shows a longitudinal sectional representation through a built rotor shaft according to the invention.

According to FIGS. 1 to 7, a built rotor shaft 1 according to the invention of an electric motor 2 which is otherwise not shown comprises a hollow shaft 3 in which on the longitudinal end side a joining region 4 of a shaft end piece 5 is arranged. Likewise provided is a channel 6 for cooling medium conduction which connects an interior 7 of the shaft 3 with an environment 8. In order to now avoid in particular complicated inclined bores for producing the channel 6 and be able to form the same in particular more cost-effectively, the channel 6 is divided into an opening 9 to be drilled comparatively easily into the shaft 3 and a channel section 10 communicatingly connected therewith in the joining region 4 of the shaft end piece 5. Both the opening 9, which can be introduced as simple radial bore into the shaft and also the channel section 10 in the joining region 4 of the shaft end piece 5 can be produced in terms of production engineering easily, highly precisely and also cost-effectively, as a result of which the entire built rotor shaft 1 can be produced more cost-effectively. In addition, elaborate deburring can be omitted which would occur when drilling through the channel 6 by means of a drill from the outside to the inside.

Figure 3:
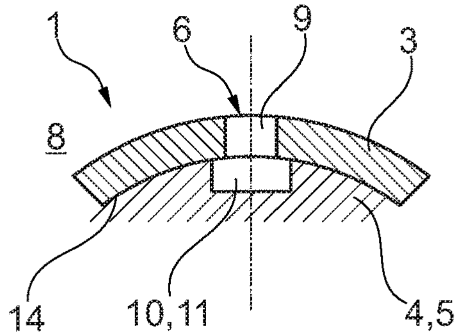
FIG. 3 shows a cross-sectional representation through the rotor shaft according to the invention with a channel section formed as longitudinal groove in the shaft end piece.
Figure 4:
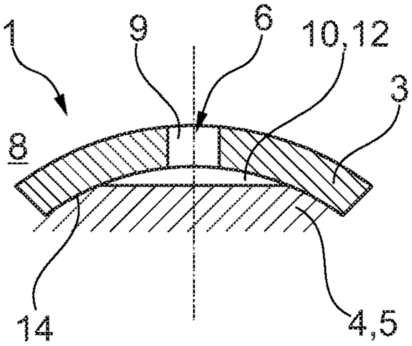
FIG. 4 shows a representation as in FIG. 3, however with a channel section formed as circumferential flat.

Viewing the cross-sectional representations in FIGS. 3 and 4 it is noticeable that the channel section 10 according to FIG. 3 is formed as a longitudinal groove 11 while the channel section 10 according to FIG. 4 is formed as a circumferential flat 12. A longitudinal groove 11 extends in the axial direction of the hollow shaft 3. Regardless of the design of the channel section 10, a continuous channel 6 for cooling medium conduction for example from the interior 7 to the environment 8 takes place via the said channel section 10 and the opening 9 arranged in the shaft 3.

Figure 2:
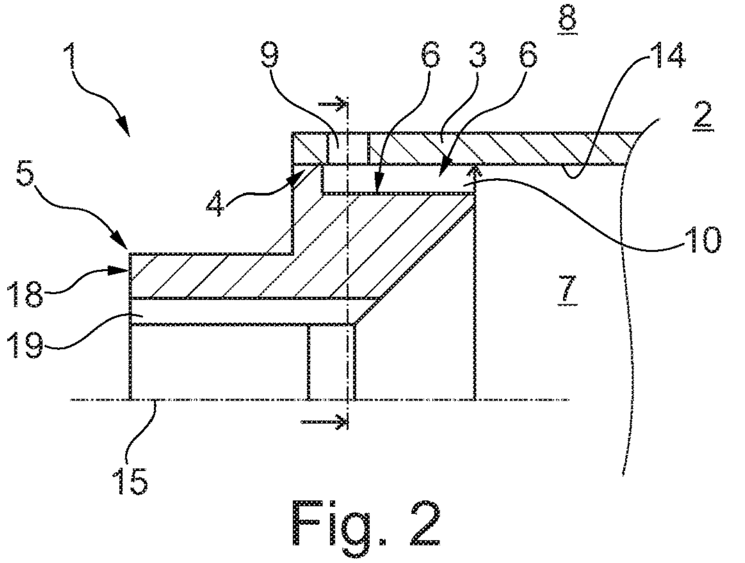
FIG. 2 shows a detailed representation from FIG. 1 in the region of a channel for cooling medium conduction.

In the embodiments of the rotor shaft 1 according to the invention shown according to FIG. 2 to 4 it is required to insert the shaft end piece 5 at the correct angle of rotation into the shaft 3 so that the channel section 10 can also be connected with the opening 9 in the shaft 3 in a fluid-transmitting manner.

Figure 5:
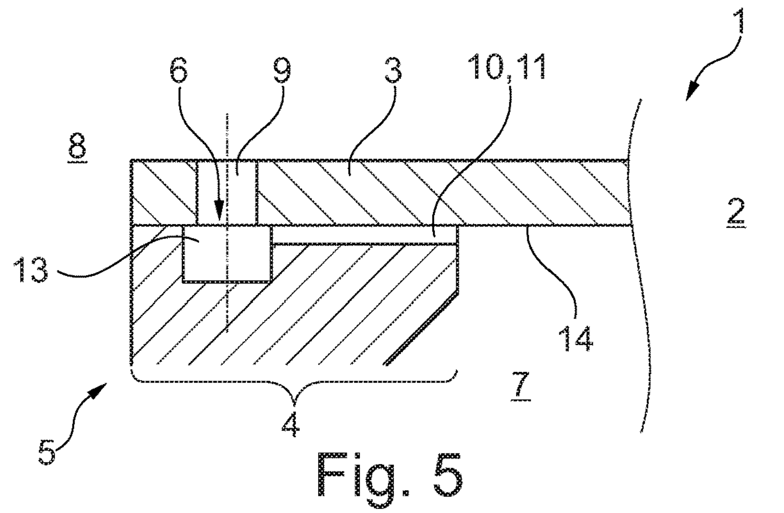
FIG. 5 shows a representation similar to FIG. 2, however with a circumferential groove.
Figure 8:
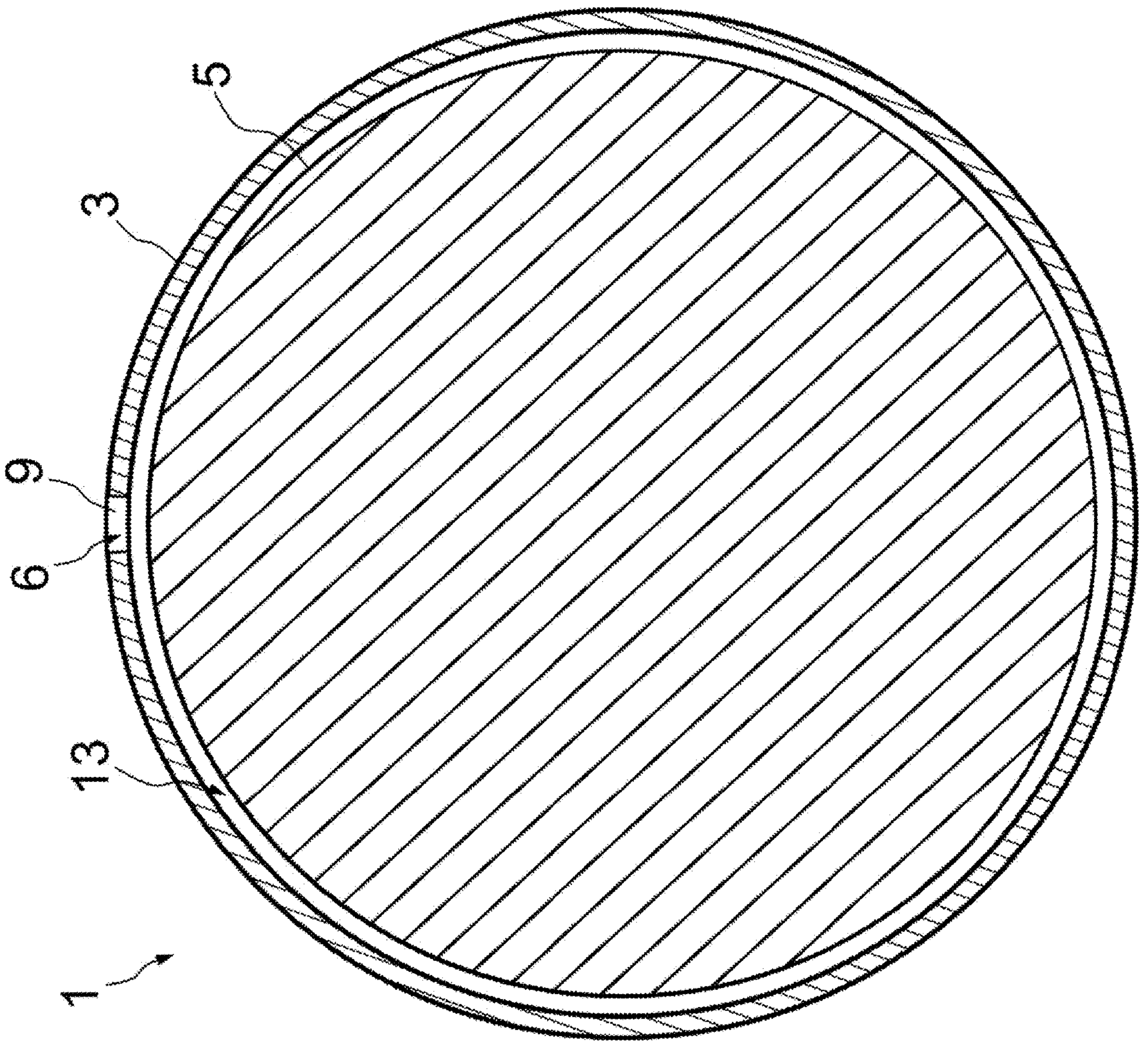
FIG. 8 shows a cross-sectional representation through the rotor shaft according to the invention with a circumferential groove formed in the shaft end piece.

In the embodiment shown according to FIG. 5, by contrast, the joining region 4 of the shaft end piece 5 comprises a circumferential groove 13 (e.g., a channel section) crossing the channel section 10 (e.g., an additional channel section), as a result of which the shaft end piece 5 can be connected with the shaft 3 regardless of the angle of rotation and a communicating connection between the interior 7 and the environment 8 is always present via the channel section 10, for example the longitudinal groove 11 (e.g., an additional channel section), the circumferential groove 13 as well as the opening 9 in the shaft 3. A cross-section through a circumferential groove 13 is depicted in FIG. 8.

Figure 6:
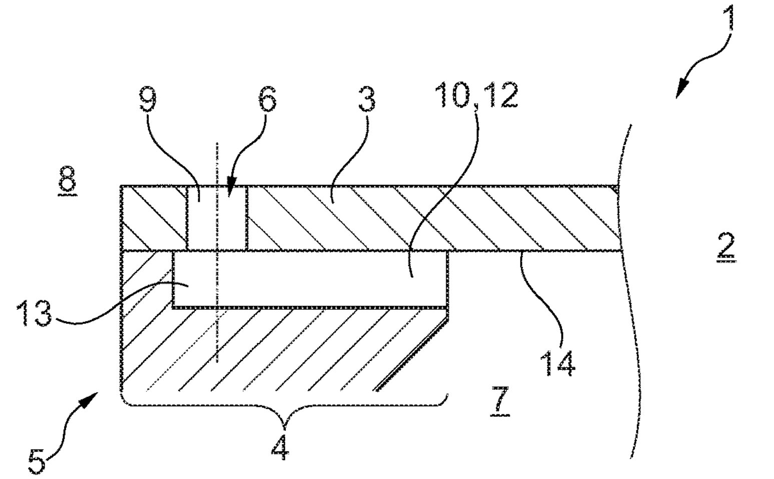
FIG. 6 shows a representation as in FIG. 5, however with a channel section formed as circumferential flat.

According to FIG. 6, such a circumferential groove 13 is likewise provided there, which connects the channel section 10 formed in this case as circumferential flat 12 with the opening 9 in the shaft 3 in a fluid-transmitting manner. Analogous to the embodiment of the rotor shaft 1 according to the invention corresponding to FIG. 5, the shaft end piece 5, with the rotor shaft 1 shown according to FIG. 6, can also be inserted into the shaft 3 regardless of the angle of rotation.

All embodiments of the rotor shaft 1 according to the invention shown according to FIG. 2 to 6 have in common that the channel section 10 of the channel 6 is arranged close the bore, i.e. close to an inner lateral surface 14 of the shaft 3, as a result of which comparatively little cooling medium remains in the interior 7 of the rotor shaft during the operation.

Figure 7:
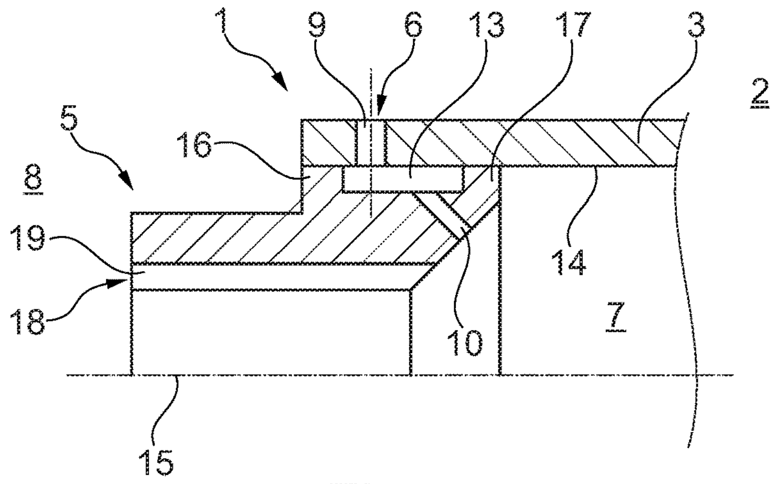
FIG. 7 shows a further alternative embodiment with a channel section arranged inclined relative to a shaft axis.

If the quantity of cooling medium remaining in the interior 7 of the rotor shaft is to be increased, the embodiment shown according to FIG. 7 is an option, in which the joining region 4 of the shaft end piece 5 likewise comprises a circumferential groove 13 (e.g., a channel section) which, with finish-mounted and built rotor shaft 1, is communicatingly connected with the opening 9 in the hollow shaft 3. However, the channel section 10 (e.g., an additional channel section) in this case is arranged or oriented inclined relative to a shaft axis 15 and connects the circumferential groove 13 with the interior 7 of the shaft 3. In this case, the opening of the channel section 10 is thus significantly further distant from the inner lateral surface 14 of the shaft 3 than is shown with the embodiments according to FIG. 2 to 6, as a result of which during the operation of the rotor shaft 1 more cooling medium remains in the interior 7 of the shaft 3.

The circumferential groove 13 according to FIG. 7 is sealed against the inner lateral surface 14 of the shaft 3 via a first sealing collar 16 and a second sealing collar 17, as a result of which a discharge of cooling medium from the interior 7 preferentially takes place exclusively via the channel 6. For joining the shaft end piece 5 with the shaft 3 of the rotor shaft 1 the shaft end piece 5 can be pressed, glued, soldered, welded with its joining region 4 in the shaft 3 or be joined via a thermal joining connection. All embodiments have in common that these make possible a reliable connection of the shaft end piece 5 with the shaft 3 in the long term.

In addition, the shaft end piece 5 can comprise an output element which in turn can comprise an external toothing or an internal toothing 19 which is not shown in more detail, so that for connecting the output element 18 with a downstream component for transmitting torque, a plug connection can be realised. For this purpose, an external toothing of the downstream component formed complementarily to the internal toothing 19 is inserted into the output element 18 of the shaft end piece 5. A major advantage here is that an opening of the channel section 10, irrespective of the selected embodiment, lies outside such a possible internal toothing 19, as a result of which no elaborate deburring is required whatsoever.

The rotor shaft 1 according to the invention is employed for example in a liquid-cooled electric motor 2, which can be employed in turn as traction motor, in particular in an electric vehicle.

With the rotor shaft 1 according to the invention, a simple production of the channel 6 conducting the cooling medium can be achieved since the same need no longer be elaboratively and thus expensively drilled in one piece as in the past but can be assembled from the shaft-side 9 and the shaft end piece-side channel section 10 or, if applicable, additionally from a circumferential groove 13 and therefore easily produced separately.

The invention claimed is:

1. A built rotor shaft of an electric motor, comprising:
- a hollow shaft;
- a shaft end piece having a joining region, the shaft end piece arranged in a longitudinal end side of the hollow shaft;
- a channel for cooling medium conduction, the channel connecting an interior of the hollow shaft with an environment;
- wherein the channel includes (i) an opening arranged in the hollow shaft and (ii) a channel section communicatingly connected with the opening in the joining region of the shaft end piece; and
- wherein at least a portion of the channel section is defined by and radially between the hollow shaft and the joining region of the shaft end piece;
- wherein an additional channel section is defined by and extends through the joining region of the shaft end piece;
- wherein the channel is defined by the channel section, the additional channel section, and the opening of the hollow shaft;
- wherein the joining region of the shaft end piece includes a circumferential groove which at least partially defines the channel section and is communicatingly connected with the opening in the hollow shaft; and
- wherein the additional channel section extends inclined relative to a shaft axis and connects the circumferential groove with the interior of the hollow shaft.

2. The built rotor shaft according to claim 1, wherein the opening arranged in the hollow shaft is a radial bore.

3. The built rotor shaft according to claim 1, wherein the circumferential groove extends circumferentially around the shaft end piece.

4. The built rotor shaft according to claim 1, wherein the circumferential groove is sealed relative to an inner lateral surface of the hollow shaft via a first sealing collar and a second sealing collar that protrude radially outward from and extend circumferentially about the joining region of the shaft end piece.

5. The built rotor shaft according to claim 1, wherein the joining region of the shaft end piece is at least one of pressed, glued, soldered, thermally joined, and welded in the hollow shaft.

6. The built rotor shaft according to claim 1, wherein the shaft end piece includes an output element.

7. The built rotor shaft according to claim 6, wherein the output element includes at least one of an external toothing and an internal toothing.

8. A liquid-cooled electric motor, comprising a built rotor shaft according to claim 1.

9. A built rotor shaft of an electric motor, comprising:
- a hollow shaft including an interior and a radial opening;
- a shaft end piece having a joining region disposed in the interior of the hollow shaft;

a channel through which a cooling medium is conductible, the channel connecting the interior of the hollow shaft with an environment; and a channel section defined by and between the hollow shaft and the joining region of the shaft end piece, the channel section communicatingly connected with the opening of the hollow shaft and the interior of the hollow shaft;

wherein an additional channel section is defined by and extends through the joining region of the shaft end piece;

wherein the channel is defined by the channel section, the additional channel section, and the opening of the hollow shaft;

wherein the joining region of the shaft end piece includes a circumferential groove which at least partially defines the channel section and is communicatingly connected with the opening of the hollow shaft; and wherein the additional channel section extends inclined relative to a shaft axis and connects the circumferential groove with the interior of the hollow shaft.

10. The built rotor shaft according to claim 9, wherein the circumferential groove extends circumferentially around the shaft end piece.

11. The built rotor shaft according to claim 10, wherein:

the shaft end piece further includes a passage that at least partially defines the additional channel section; and the passage is defined by the joining region of the shaft end piece, opens into the circumferential groove, and extends transversely to an axial direction and a radial direction of the hollow shaft.

12. The built rotor shaft according to claim 9, wherein the shaft end piece further includes an output element that projects from a longitudinal end of the hollow shaft and that is disposed at least partially outside of the interior of the hollow shaft.

13. A built rotor shaft of an electric motor, comprising:

a hollow shaft including an interior and a radial opening;

a channel through which a cooling medium is conductible, the channel connecting the interior of the hollow shaft with an environment; and a shaft end piece having a joining region disposed in the interior of the hollow shaft, the shaft end piece including:

a circumferential groove that at least partially forms a channel section defined by and between the hollow shaft and the joining region of the shaft end piece, the circumferential groove disposed in the joining region of the shaft end piece and extending circumferentially around the shaft end piece; and a passage that opens into the circumferential groove and that at least partially defines an additional channel section, the passage defined by the joining region of the shaft end piece and extending transversely to an axial direction and a radial direction of the hollow shaft;

wherein the channel is defined by the channel section, the additional channel section, and the opening of the hollow shaft;

wherein the opening of the hollow shaft and the additional channel section are communicatingly connected via the channel section; and wherein the channel section and the interior of the hollow shaft are communicatingly connected via the additional channel section.

* * * * *